United States Patent [19]

Vercauteren

[11] Patent Number: 5,504,935
[45] Date of Patent: Apr. 2, 1996

[54] MOBILE COMMUNICATION NETWORK HAVING PATH SELECTION MEANS FOR SELECTING A COMMUNICATION PATH

[75] Inventor: Leo A. A. Vercauteren, Gent, Belgium

[73] Assignee: Alcatel N.V., Amsterdam, Netherlands

[21] Appl. No.: 208,429

[22] Filed: Mar. 8, 1994

[30] Foreign Application Priority Data

Mar. 9, 1993 [EP] European Pat. Off. ............. 93870041

[51] Int. Cl.$^6$ ........................................................ H04Q 7/22
[52] U.S. Cl. ......................... 455/33.2; 455/56.1; 379/60
[58] Field of Search ................................. 455/33.1, 33.2, 455/54.1, 54.2, 56.1, 15, 20, 89; 379/59, 60

[56] References Cited

U.S. PATENT DOCUMENTS

| | | | |
|---|---|---|---|
| 5,067,173 | 11/1991 | Gordon | 455/33.1 |
| 5,175,872 | 12/1992 | Borras | 455/89 |
| 5,325,419 | 6/1994 | Connolly et al. | 379/60 |
| 5,327,575 | 7/1994 | Menich et al. | 455/33.2 |
| 5,345,499 | 9/1994 | Benveniste | 455/33.2 |

FOREIGN PATENT DOCUMENTS

| | | |
|---|---|---|
| 0188322 | 7/1986 | European Pat. Off. . |
| 0418096 | 3/1991 | European Pat. Off. . |
| 0462727 | 12/1991 | European Pat. Off. . |

OTHER PUBLICATIONS

Electronics and Communication Engineering Journal, vol. 4, No. 5 Oct. 1992, London GB, pp. 331–340, S. T. S. Chia et al 'UMTS–Mobile Communications beyond the year 2000: Requirements, architecture and System options'.

*Primary Examiner*—Edward F. Urban
*Attorney, Agent, or Firm*—Ware, Fressola, Van Der Sluys & Adolphson

[57] ABSTRACT

The invention concerns a mobile communication network (MCN) having communication paths (DCMRN, FBS, LE or ICMRN, RS, GCFN/GCRN, FBS, LE) between any one of mobile terminals (MT) and a fixed telecommunication network (FTN). Each communication path (DCMRN, FBS, LE or ICMRN, RS, GCFN/GCRN, FBS, LE) has a radio access link (DCMRN, ICMRN) between a mobile terminal (MT) and a relay station (RS) and has a relay link (GCFN/GCRN) between the relay station (RS) and a fixed base station (FBS). The mobile communication network has path selection means (FBS) for selecting, as part of a hand-over decision, a communication path (DCMRN, FBS, LE or ICMRN, RS, GCFN/GCRN, FBS, LE) between the mobile terminal (MT) and the fixed telecommunication network (FTN) based on measurement data of characteristics of radio access links (DCMRN/ICMRN) included in the possible communication paths (DCMRN, FBS, LE or ICMRN, RS, GCFN/GCRN, FBS, LE). The path selection means (FBS) also bases its selection on measurement data of characteristics of the relay links (GCFN/GCRN) included in the communication paths (DCMRN, FBS, LE or ICMRN, RS, GCFN/GCRN, FBS, LE).

18 Claims, 6 Drawing Sheets

5,504,935

MOBILE COMMUNICATION NETWORK HAVING PATH SELECTION MEANS FOR SELECTING A COMMUNICATION PATH

TECHNICAL FIELD

The present invention relates to a mobile communication network adapted to set up communication paths between any one of a plurality of mobile terminals and a fixed telecommunication network and each including a radio access link and at least one of said paths including such a radio access link between one of said mobile terminals and one of a plurality of relay stations and a relay link between said one relay station and one of a plurality of base stations, said network including path selection means for selecting, as part of a hand-over decision, at least one communication path from a plurality of possible communication paths between said one mobile terminal and said fixed network based on measurement data of characteristics of radio access links included in said possible paths.

BACKGROUND OF THE INVENTION

Such a mobile communication network is already known in the art, e.g. from the pan-European digital cellular GSM network.

In this known network the terminals can be both hand-held and vehicle-operated. Whereas high speed vehicle-operated terminals require large cell sizes to reduce the number of hand-overs between cells, hand-held terminals necessitate small cell sizes as they inherently cover only a relatively small area due to their relatively low power consumption. Therefore the network infrastructure comprises two cellular structures each adapted to a specific environment: a first one with large cell sizes or macro-cells e.g. around rural areas in which only vehicle-operated terminals need to be supported and a second one with small cell sizes or micro-cells e.g. for pedestrian areas.

In the first structure the radio access links are used to directly access the base stations, known as base station controllers, one of which is provided in each macro-cell. These controllers are relatively complex as they have to provide the mobility control, including the hand-over decisions, and the routing to the fixed network. In the second structure such a solution would lead to a commercial drawback since providing such a complex base station in each micro-cell would require huge investments. Therefore, in the micro-cells, use is made of relay stations, called base transceiver stations, which have a minimum intelligence in the micro-cells and the traffic of a number of which, for instance corresponding to a macro-cell, is concentrated in a base station.

In this known mobile network the relay links are so designed that their influence on the ever-all communication path from a mobile terminal to the fixed network is negligible, so that only characteristics of the radio access link, which are variable due to the roaming behaviour of the mobile terminals, have to be considered.

The above network can however not be used for other environments than those for which it is expressly designed, i.e. high power vehicle-operated terminals in rural areas and low power hand-held terminals in pedestrian areas, since this would require an infrastructure other than the one described above. A further commercial drawback of the known infrastructure being the need for a separate network of relay links in order for these to be of the desired type with negligible influence on the over-all communication paths.

SUMMARY OF THE INVENTION

Accordingly, an object of the present invention is to provide a mobile communication network of the above known type but which is commercially more viable and allowing a greater variety of environments.

This object is achieved due to the fact that in the present mobile communication network said path selection means also bases its selection on measurement data of characteristics of the relay links included in said possible paths.

By also taking into account characteristics of the relay links when making a hand-over decision, these relay links are allowed to have a significant influence on the over-all communication paths and this influence moreover need not be known beforehand. This means that the relay links of the present mobile communication network may be of different types, e.g. radio or fixed network links, and/or have dynamically varying characteristics, e.g. load, bit error rate BER, availability or quality of service QOS.

Due to the above flexibility provided by such relay links, the present mobile communication network can be adapted to allow any environment. Indeed, each such environment can be covered by a specific relay station which, regardless of the environment, can always be coupled to a fixed base station by choosing an appropriate relay link connecting it to that base station. The fixed base station can then provide the complex control functions such as the hand-over decision for each such environment.

A first example of such an adaptation concerns a Mobile Customers Premises Network, such as a train, in which low power hand-held terminals can only be used if an intermediate power boosting level, i.e. a relay station mounted on the train, is used. This relay station behaves as a mobile terminal with respect to the base stations and the overall control of the communication path then requires, when making a hand-over decision, knowledge of the characteristics of the relay link which is in this case a mobile radio link. If, moreover, in a second example the same hand-held terminal is to be used in the users own home, this can be done by a relay station substituting a known cordless control unit and coupled to a base station via a relay link which is in this case a link of the fixed network.

The above examples clearly indicate that the present network allows relatively global coverage, even if only a single uniform type of radio access link is used, and provides a general framework for a plurality of applications and environments which can be cost-effectively integrated in a single network and controlled by a single set of base stations.

A further advantage of the present invention is that these relay links which are conceptually included in the mobile network can physically form a part of the existing fixed telecommunication network due to the fact that these relay links are allowed to have dynamically varying characteristics. This feature improves the integration of both networks resulting in an efficient use of network equipment.

It is to be noted that the above is in conformance with and essential to the evolution towards a Future Public Land Mobile Telecommunication System FPLMTS, e.g. the Universal Mobile Telecommunication System UMTS under study with the European Community, which aims at integrating all mobile applications and environments in a single mobile network which is itself maximally integrated in the fixed telecommunication network, e.g. the Broadband Integrated Data Services Network B-ISDN.

A characteristic feature of the present invention is that the mobile network includes a plurality of types of relay links and a plurality of types of relay stations, and that each relay station provides a specific coverage area for said mobile terminals whilst the type of each relay link is dependent on characteristics of the relay station and of the base station interconnected by it.

By so doing particularly, the positioning of the base stations is substantially independent from the specific coverage areas. Hence also, any environment can be covered by a specific coverage area provided by a relay station of a specific type whilst the positioning of these relay stations does not directly affect the positioning of the base stations. This allows the fixed level and the characteristics of the mobile terminals and radio access links to be optimized independently whilst still providing coverage for any environment. It can be seen in this respect that the relay stations and links act as an isolating screen between the above fixed level dedicated to the mobility control and the network part dedicated to the radio access.

The latter feature is also important from a commercial viewpoint since, by using appropriate relay links suitably concentrating the traffic, a reduction in the number of costly base stations is obtained. For instance, instead of providing a base station covering the hand-held terminals in every rural village, the mobile communications of this rural village can be relayed to a central base station via a 'static' radio link.

A further characteristic feature of the present invention is that on said radio access links use is made of a plurality of predetermined transmission protocols corresponding to distinct types of relay stations, and that said path selection means makes said hand-over decision regarding communication paths including radio access links by way of either one of said transmission protocols.

Due to the fact that the base stations may be positioned without taking the radio transmission protocols into account, a single control structure can be used to process all communications regardless of the mentioned protocol. More particularly, in this way, the base stations may be shared and their functionalities reused for communications via different radio transmission protocols on the radio access links.

Yet another characteristic of the present mobile communication network is that at least one of said mobile terminals is a multi-mode mobile terminal adapted to operate according to either one of at least two transmission protocols of said plurality of protocols, and that said selection also comprises a selection among said distinct types of relay stations.

The shared control structure consisting of the mentioned base stations may, due to the above characteristic, even be used to perform hand-overs for the multi-mode terminal between two radio access networks defined by two distinct radio transmission protocols, e.g. the land and the satellite radio access network, for instance according to the cost of the communication path.

The above features clearly result in an improved integration of various telecommunication networks, in this case various radio access networks in a single mobile network according to the present invention, and consequently in an even more cost-effective solution.

Still another important feature of the present invention is that a first one of said types of relay stations comprises a fixed relay station connected to at least one of said base stations via at least one type of relay link which is at least partly constituted by a link of said fixed network.

In this way the integration of the mobile network and the fixed network can be increased as already mentioned, but also a framework is provided for a further feature of the present invention which is discussed hereafter.

This feature consists in that said first type of relay stations includes at least one relay station coupled to a plurality of base stations via a corresponding plurality of relay links of said last mentioned type of relay links.

In so doing every relay station of the first type can be interconnected with a theoretically unlimited number of fixed base stations. Such flexible interconnection by way of the fixed network can be used to provide a number of relay links for each such relay station connecting it to all nearby fixed base stations. The latter allows the hand-over decision to be very flexible as discussed hereafter.

A first application is self-healing in case of failure of one of the base stations through an automatic connection of all affected relay stations to a nearby operational base station. A second application is that by providing multiple relay links for some relay stations, it can be achieved that the cell boundaries associated with each base station overlap. This can be used to avoid simultaneous inter base station and inter relay station hand-overs and to improve the hand-over in case a mobile terminal roams near these boundaries. Indeed, in both cases the overlapping boundaries allow a gradual handing over of the communication.

It can further be allowed that relay links which are at least partly constituted by a link of the fixed network and which are not included in a default state of the mobile network, i.e. not included in the measurement data used for the hand-over decision, can be dynamically set up in order to cope with some dynamic network requirements. In so doing the flexibility of the network can still be exploited without overly complicating the hand-over decision. Indeed, these relay links have only to be taken into account when the instantaneous state of the network so requires.

The invention further relates to a hand-over protocol regulating the steps needed up to and including the execution of a hand-over based on the hand-over decision.

This hand-over protocol is particularly concerned with the signalling needed to concentrate all relevant measurements in the selection means in order for the latter to be able to make the required hand-over decision.

The hand-over protocol used in the known network obviously does not suffice for a mobile network according to the present invention.

A further object of the present invention is therefore to provide a hand-over protocol for use in a mobile communication network of one of the types described above.

This object is achieved due to the fact that it includes a tracking step in which said measurement data are collected in and organized by said one mobile terminal, a forwarding step in which said organized measurement data are forwarded to said path selection means which are included in said one base station, a decision step and an execution step in which said hand-over decision is made and executed by said selection means based on said organized measurement data respectively.

In this way, the fixed base station used to couple one of the mobile terminals to the fixed network is also used as the means to make and execute the hand-over decision. Moreover, by providing a tracking step in which both the radio link and the relay link measurement data are gathered in the mobile terminal, the signalling load associated to the hand-over protocol is clearly removed from the fixed network. This is advantageous since such signalling load on the fixed network is unallowable because the structure of this fixed network is unknown and cannot be relied upon, i.e. it cannot be guaranteed that its structure is suited for the vital signalling needed in the hand-over protocol.

The present hand-over protocol thus uses the most suitable place for collecting both the radio link and relay link measurement data, i.e. the mobile terminal, since the latter is the sole consistent part of the communication between itself and the fixed network if the latter may not be used for hand-over signalling.

Still another object of the present invention is to provide a mobile terminal adapted to the above protocol and more particularly suited to organize the radio and relay measurements in an appropriate way.

This object is achieved due to the fact that the mobile terminal, to perform said tracking step, includes:

receive means for receiving tracking signals transmitted by base stations and/or relay stations included in said possible paths and connected to said mobile terminal via a radio access link and said tracking signals including information indicative of said measurement data;

measurement extraction means for extracting said radio link and relay link measurement data from said received tracking signals; and, organization means for deriving said organized measurement data under the form of a communication tree with branches corresponding to said possible paths.

Such a communication tree is a simple and powerful way of organizing the measurement data and is therefore particularly well suited for communication with the base station making the hand-over decision.

Yet another object of the present invention is to provide a base station adapted to the above protocol and more particularly suited to a flexible, reliable and rapid hand-over.

This object is achieved due to the fact that the base station, to perform said decision step and execution step, includes:

said path selection means for making said hand-over decision based on said organized measurement data under the form of:

an active communication set consisting of at least one communication path which is to be used for said communication between said mobile terminal and said fixed network;

a redundant communication set consisting of stand-by communication paths; and, execution means for executing said hand-over decision by:

activating/deactivating a communication path which is added/removed with respect to a previous active set in such a way that said communication is performed via said active set; and allocating/deallocating to said communication a communication path which is added/removed with respect to a previous redundant set in such a way that all preparations for activating said redundant set are performed.

By defining both an active and a redundant set of communication paths, the present base station is well adapted to execute rapid hand-overs in a telecommunication network. Indeed, in such a network communication can take place over a communication path only after two steps are performed, i.e. a first step consisting of allocating the path to a communication of a specific mobile terminal and in which all necessary signalling is performed in order to notify the relevant parts of the network of this new communication path, and a second step consisting in activating the path, i.e. in reserving bandwidth. This first step is particularly time consuming due to the signalling associated with it, particularly but not exclusively when the relay links form part of an Asynchronous Transfer Mode backboning fixed network.

By allocating those paths, bundled in the redundant set, which in a next hand-over decision may become a part of the active set to be effectively used for the communication, the execution of a hand-over decision that requires the time consuming first step to be executed, is to a large extent avoided.

Yet another characteristic feature of the present base station is that said redundant/active set contains communication paths which are not included in said organized measurement data and are set up/released as a part of said allocating/deallocating step.

In this way, the hand-over decision is not limited to the relay links included in the default state of the network and the radio access links for which a tracking signal has been received. This feature can be used to allow or facilitate the features, discussed hereafter, through adaptation to the instantaneous requirements of the network. It also provides a means to use the above mentioned overlapping cell boundaries even when these are not established via the default state of the network.

Still a further characteristic feature of the present base station is that said active set contains a plurality of parallel communication paths over which the same information is transmitted and which are all coupled to said one base station.

Such parallel paths may be required if the mobile network is to support macro-diversity or soft-handover. In the first case the information of a plurality of communication paths is used to reconstruct the signal transmitted by the mobile terminals in order to achieve e.g. a desired Bit Error Rate BER, whereas in the second case the hand-over is not performed abruptly but gradually whilst using in an intermediate stage the information from both paths involved in the hand-over. Since all parallel paths can be made to end in a single base station which, the latter is able to perform all control operations. This can be allowed since the present network always allows appropriate relay links to be set up, for instance via the backboning fixed network. Furthermore, this centralized control diminishes even further the signalling load on the fixed network.

Yet a further feature of the present base station is that said parallel communication paths include a radio access link not included in said organized measurement data.

In this way, if a mobile terminal roams near the boundaries of a coverage area corresponding to a specific relay station and can at any moment require a sudden hand-over to a relay station not included in the communication tree, connection loss can be avoided by already including the radio access link coupled to the latter relay station in the active set. Indeed, the sudden hand-over is then no longer required since a soft hand-over as described above can always take place.

A final characteristic feature of the present invention is that one of said characteristics is the ownership of said radio access links, relay stations and relay links, said selection means taking into account the availability and cost of said communication paths associated with said ownership.

By taking the ownership of the various parts of a communication path into account in the hand-over decision a means is provided for allowing the presence of different owners of different parts of the network, e.g. owners of different radio access networks. Indeed, the hand-over decision can then take into account the negotiated use of all network parts.

By allowing different owners for different parts of the network, the investment required to obtain a desired coverage area can be spread between the various interested parties. These privately owned parts of the network can then be integrated within a same network providing for instance a publicly owned backboning control network consisting of the fixed base stations.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
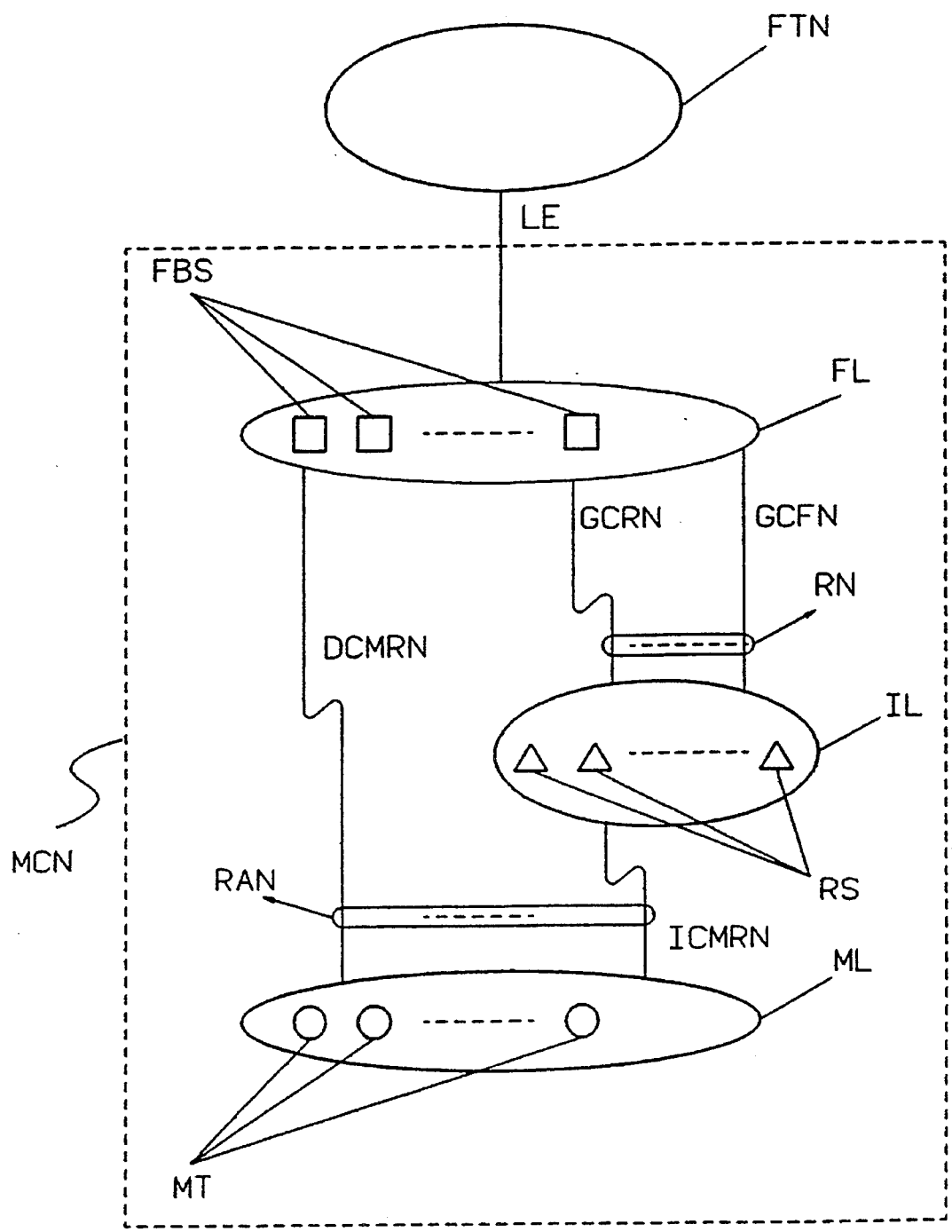
FIG. 1 shows the logical structure of a mobile communication network MCN according to the present invention and coupled to a fixed telecommunication network FTN.

The mobile communication network MCN whose generic structure is shown in FIG. 1 has three communication levels: a fixed level FL comprising fixed base stations FBS, an intermediate level IL comprising relay stations RS and a mobile level ML comprising mobile terminals MT. The purpose of the mobile communication network MCN is to set up communication paths between a fixed telecommunication network FTN, for instance an Asynchronous Transfer Mode or ATM based Broadband Integrated Services Network B-ISDN, and any one of the roaming mobile terminals MT. This can be achieved via the interconnections shown in FIG. 1 and described hereafter.

The roaming mobile terminals UT can be coupled to the fixed base stations FBS of the fixed level FL either directly by way of a direct coverage mobile radio network DCMRN or indirectly via an indirect coverage mobile radio network ICMRN linked to the intermediate level IL and either a global coverage radio network GCRN or a global coverage fixed network GCFN between the intermediate level IL and the fixed level FL. According to conventional telecommunication practice, the fixed level FL is linked to the fixed telecommunication network FTN via local exchanges LE, each fixed base station FBS being linked to the fixed telecommunication network via a dedicated local exchange LE.

Throughout the following the combination of the global coverage radio network GCRN and the global coverage fixed network GCFN will be called a relay network RN with each link within the relay network RN being called a relay link. Similarly, the combination of the direct coverage mobile radio network DCMRN and the indirect coverage mobile radio network ICMRN the will be called radio access network RAN with each link within the radio access network RAN being called radio access link.

It is to be noted that the mobile communication network MCN is suited for use in a universal mobile telecommunication system and that its constituent parts are well known to a person skilled in the art. Therefore these parts are not described here, it being implicitly understood throughout the following that, from the given description and his general knowledge, the skilled person can implement the network MCN.

The direct coupling of the mobile terminals MT to the fixed base stations FBS via the direct coverage mobile radio network DCMRN is intended for high power vehicle-operated terminals which, thanks to their long range, can be coupled in a relatively large area around one of the fixed base stations FBS. Also low power hand-held terminals can communicate via the direct coverage mobile radio network DCMRN but only in a relatively small area.

In order to provide a more global coverage for hand-held mobile terminals MT in a plurality of environments without increasing the number of fixed base stations FBS the mobile communication network MCN also provides for the indirect coupling to the fixed base stations FBS via the indirect coverage mobile radio network ICMRN. The latter feature is important in view of the fact that the fixed base stations FBS are rather complex since, as will be seen later, they have to provide mobility control for the mobile terminals MT and routing to the fixed telecommunication network FTN.

The indirect coupling via the indirect coverage mobile radio network ICMRN allows the mobile terminals MT to be coupled to the fixed base stations FBS via relay stations RS which are less complex than the fixed base stations FBS in that they do not have to provide the above control and routing functions. These relay stations RS are in turn coupled to the fixed base stations FBS, also providing control and routing functions for the indirectly coupled mobile terminals MT, via the relay network RN. The relay network RN contains at least two types of relay links, fixed links known as the global coverage fixed network GCFN and radio links known as the global coverage radio network GCRN. To each type of relay link corresponds a distinct type of relay station RS.

Each type of relay station RS can be used to provide a specific coverage area for the mobile terminals MT and hence to adapt the mobile network MCN to a specific environment wherein the mobile terminals MT may be situated. For instance, a type corresponding to the global coverage radio network GCRN may be used as relay station mounted on a train whereas a type corresponding to the global coverage fixed network GCFN may be used as relay station in a subscriber premises. In both cases an appropriate relay link, i.e. a 'mobile' radio link within the global coverage radio network GCRN and a link of the fixed telecommunication network FTN within the global coverage fixed network GCFN respectively, may be chosen so as to couple the relay station RS to at least one fixed base station FBS. These fixed base stations FBS may then be clearly positioned independently from the above environments to be considered in designing the mobile communication network MCN.

From the above it follows that the generic structure of the mobile communication network MCN makes it compatible with a variety of environments associated to the mobile terminals MT and is achieved through the relay stations RS and the corresponding relay links within the relay network RN. Indeed, the intermediate level IL and the relay network RN form an isolating buffer between the fixed level FL and a radio access layer consisting of the mobile level ML and the indirect coverage mobile radio network ICMRN part of the radio access network RAN.

However, and as is also clear from the above, this generic structure cannot be achieved by providing, as in the known GSM-network (i.e. Group Special Mobile of the CEPT (Conférence Européenne Des Administrations Des Postes et Télécommunications)), an intermediate base station transceiver level coupled to the fixed level FL via links of a predetermined type. Indeed, in so doing a rigid level would be added to the network and this level would only adapt the network to a specific further environment without offering the flexibility needed for the generic structure.

It is therefore imperative that the relay links within the relay network RN may be chosen with great freedom, i.e. they should at least be allowed to have a significant, not predetermined influence on the over-all characteristics of the communication paths between the mobile terminals MT and the fixed telecommunication network FTN. In the present mobile communication network MCN this influence is variable because of dynamic characteristics on a specific relay link and/or because of a variety of types of relay links being provided within the relay network RN.

In order to provide the above mentioned flexibility of the relay links, the mobile communication network MCN has to provide the following features which concern in particular the hand-over decision which has to be made for each mobile terminal MT while it is communicating with the fixed telecommunication network FTN. As is well known in the art, such hand-overs are inherent in and vital to cellular mobile networks since the roaming behaviour of the mobile terminals MT does not allow the communication to be maintained permanently over a same communication path. This hand-over decision therefore entails selecting an optimal communication path over which the communication between the mobile terminal and the fixed telecommunication network FTN has actually the best characteristics. If this optimal path differs from the actual path, the hand-over moreover includes the handing-over of the communication to the optimal communication path.

Without explaining in detail the known technical measures needed for executing hand-overs, in the following only those details needed to adapt the hand-over protocol to the generic structure of the mobile communication network MCN will be described in detail with reference to FIG. 2 which shows a specific part of the mobile communication network MCN of FIG. 1 required to explain the communication between a mobile terminal MT1 and the fixed telecommunication network FTN.

Figure 2:
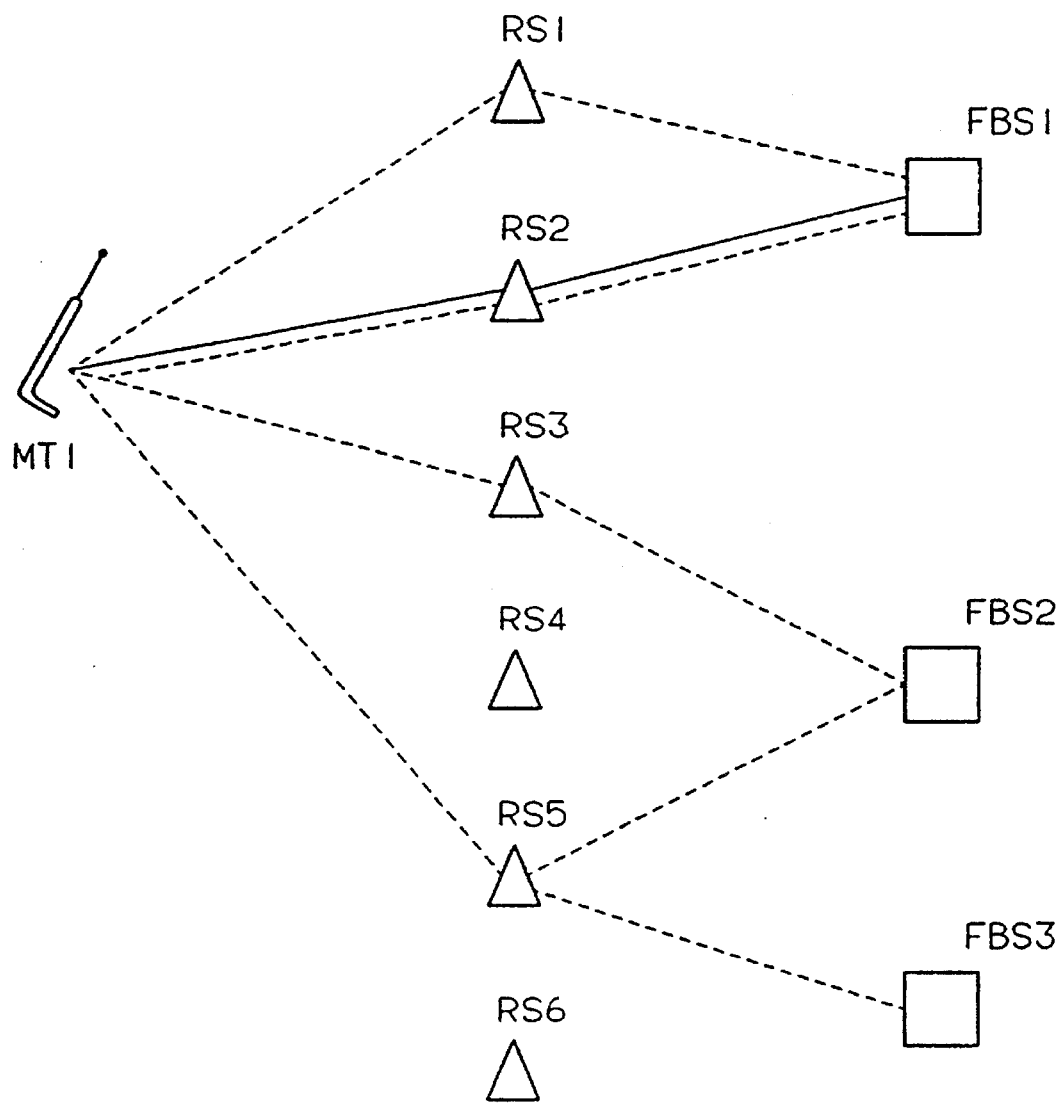
FIG. 2 represents a part of the mobile network MCN of FIG. 1 which is relevant to a mobile terminal MT1.

Besides the mobile terminal MT1, the part of the mobile communication network MCN depicted in FIG. 2 consists of 6 relay stations RS1-6 and 3 fixed base stations FBS1-3. Each of the relay stations RS1-6 has a specific coverage area which is a function of the transmit power of the mobile terminal MT1 and which is henceforth called a micro-cell. Each fixed base station FBS1-3 is coupled to a subset of the relay stations RS1-6 and correspondingly covers an area which is the concatenation of the distinct micro-cells coupled to it, and which is called a macro-cell. The actual communication path for the mobile terminal MT1 includes the relay station RS2 and the fixed base station FBS1 and the corresponding interconnections shown in full lines. The actual controlling base station of the mobile terminal MT1 is the fixed base station FBS1.

Generally, each hand-over protocol includes at least the following steps: a tracking step in which measurement data regarding the environment of the mobile terminal the mobile terminal MT1 are collected and organized by MT1, a forwarding step in which these measurement data are forwarded to the actual controlling base station FBS1, and a decision and execution step in which the hand-over decision is made and executed by the actual controlling base station FBS1 respectively.

In the tracking step the radio access links within the radio access network RAN that can be used in paths between the mobile terminal MT1 and the base stations FBS1–6 of the fixed level FL are first checked. This is achieved by a tracking signal broadcast by each of the relay station RS1–6. From the tracking signals received with acceptable quality, the mobile terminal MT1 can discern which of the radio access links of the radio access network RAN are available to it. In the present example the result of the above check is that the mobile terminal MT1 can communicate via the relay stations RS1–3 and RS5 shown in dashed lines in FIG. 2.

Since, generally, a plurality of paths are available, also some characteristics of these paths are measured in order to be able to discriminate between them and to select an optimal path. These measurements constitute an essential difference between the present mobile communication network MCN and hand-over protocol and known networks and protocols because they not only concern the radio access links but also the relay links. Only in this way can the hand-over decision take into account which relay links are available between each relay station RS1–6 and the fixed level FL—in the present network MCN possibly multiple relay links—and the variable influence of these relay links on the over-all communication paths.

To this end, the mobile terminal MT1 derives from the quality of the received tracking signals not only the quality of the corresponding radio access links but also which relay links interconnect each relay station RS1–6 with the fixed level FL and which characteristics these relay links have. The latter information, possibly supplemented with further information regarding the radio access links, is included by each relay station RS1–6 in the tracking signal it broadcasts and can thus be extracted from the received tracking signals by the mobile terminal MT1. In the present example this yields the relay links also shown in dashed lines in FIG. 2.

The tracking step is then concluded by the mobile terminal MT1 by organizing all the information measured or extracted by it from the received tracking signals in a communication tree including the radio access links and relay links shown dashed. Each branch of this tree corresponds to a possible communication path between the mobile terminal MT1 and the fixed level FL and to each branch a number of characteristics needed for the hand-over decision and derived from the above measurements is associated by the mobile terminal MT1. This tree thus summarizes all relevant knowledge of the situation of the mobile terminal MT1 within the mobile communication network MCN and is a powerful and convenient basis for making the hand-over decision.

In the forwarding step it is therefore this tree organizing all measurement data which is forwarded by the mobile terminal MT1 over the actual communication path, shown in full line, to the actual controlling fixed base station FBS1.

The fixed base station FBS1 then implements the last two steps of the hand-over protocol, i.e. making and executing the hand-over decision. Both the execution step and the decision step, based on the above constructed communication tree, have to be adapted to the characteristics of the present mobile communication network MCN and optimized to yield fast and reliable hand-overs.

Indeed, not only has this decision step to take into account the relay measurements but it also can use the flexibility of the mobile communication network MCN to ensure fast and reliable hand-overs. The latter flexibility results in particular from the fact that the mobile communication network MCN allows each relay station to be coupled to a plurality of base stations via appropriate relay links. In this way the relay station RS3 is coupled to both the fixed base stations FBS1 and FBS2. Such multiple relay links are possible thanks to the fact that they are not required to have predetermined characteristics and can for instance be obtained by choosing relay links at least partly constituted by links of the fixed telecommunication network FTN.

Therefore the decision step consists in selecting, on the basis of data included in the received communication tree, an active set including the optimal communication path, for instance based on a minimal overall Bit Error Rate BER, and a redundant set of communication paths, including the most likely candidates for future hand-overs. In the present example the active set comprises the communication path including the relay station RS1 and the fixed base station FBS1 whereas the redundant set comprises the actual communication path including the relay station RS2 and the fixed base station FBS1.

The execution step then consists not only in reserving the necessary bandwidth for the communication path(s) of the active set in such a way that the communication with the mobile terminal MT1 is performed over the latter path(s), but also in allocating to the communication with the mobile terminal MT1 the communication path(s) included in the redundant set with zero bandwidth. In this way all necessary preparations and signalling for establishing the last mentioned path(s) are performed without actually establishing the communication over these path(s). If a future hand-over decision then leads to an active set for the mobile terminal MT1 including a path from the redundant set, only the bandwidth has to be reserved so leading to a faster and hence also to a more reliable hand-over. In the present example, this means that the actual communication path over the relay station RS2 the fixed base station FBS1 remains allocated to the communication with the mobile terminal MT1 however with zero bandwidth. If a future decision then leads to handing the communication with the mobile terminal MT1 back over to the relay station RS2, this hand-over can be performed faster than when all signalling and not only the bandwidth reservation had to take place.

Particularly in the present mobile communication network MCN, the above described decision and execution steps can be used to improve the hand-overs even further by exploiting the above mentioned flexibility arising from multiple relay links coupled to one relay station. If for instance the next hand-over decision points to the relay station RS3 as part of the optimal communication path, two possible relay links to the fixed level FL are available. The hand-over decision can use this flexibility by including first the relay link to the fixed base station FBS1 in the redundant set and by including it in the next decision in the active set, so avoiding a hand-over comprising an inter relay station as well as an inter base station hand-over. As such a hand-over is rather complex and it is not very reliable. If the relay link to the fixed base station FBS2 is better than the one to the fixed base station FBS1, the inter base station hand-over is performed separately at a later stage.

It is to be noted that the flexibility arising from the fact that multiple relay links are provided for each relay station corresponds to the fact that the macro-cell boundaries corresponding to the base stations FBS may overlap. Such an overlap may be used, as in the above case, to avoid simultaneous inter relay station and inter base station hand-overs, but also to reduce the number of inter base station hand-overs for mobile terminals MT roaming near these boundaries. A further advantage is that due to the provision of such multiple relay links, the network MCN can be made inherently self-healing since in case of a fixed base station failure, another relay link to an operational base station can be used without further ado. Finally, load distribution over the various fixed base stations, relay stations and relay links can be obtained if such multiple relay links are available.

The latter feature is particularly of interest if the interconnection of the intermediate and fixed levels, IL and FL, uses a global coverage fixed network GCFN which is for the greater part integrated in the backboning fixed network FTN. Indeed, in this case a virtually unlimited number of relay links can be set up using the backboning fixed network FTN.

In this case a default interconnection, for instance the one depicted in FIG. 2, using only a small part, e.g. the cheapest, of all possible relay links can be established. This default interconnection is such that the relay links can be included in the above tracking signals without overly complicating the mobile communication network MCN. The above concept of the redundant set can then be refined by not restricting this redundant set to the possible paths included in the communication tree and hence not to the relay links included in the default state. If for instance the relay link between the relay station RS3 and the fixed base station FBS1, already considered above, is not included in the default state, the fixed base station FBS1 can still decide to use this relay link and include it in the redundant or active set, the allocation in this case also consisting in setting up this additional relay link. In this way the above advantages associated to multiple relay links for a single relay station can still be provided in the mobile communication network MCN.

It is to be noted that the above hand-over procedure can be adapted to provide separate hand-over decisions for the upstream and downstream communication paths in which case the flexibility of the relay links can be used to retain the overall control of the mobile terminal MT1 in a single actual controlling fixed base station FBS1.

Figure 3:
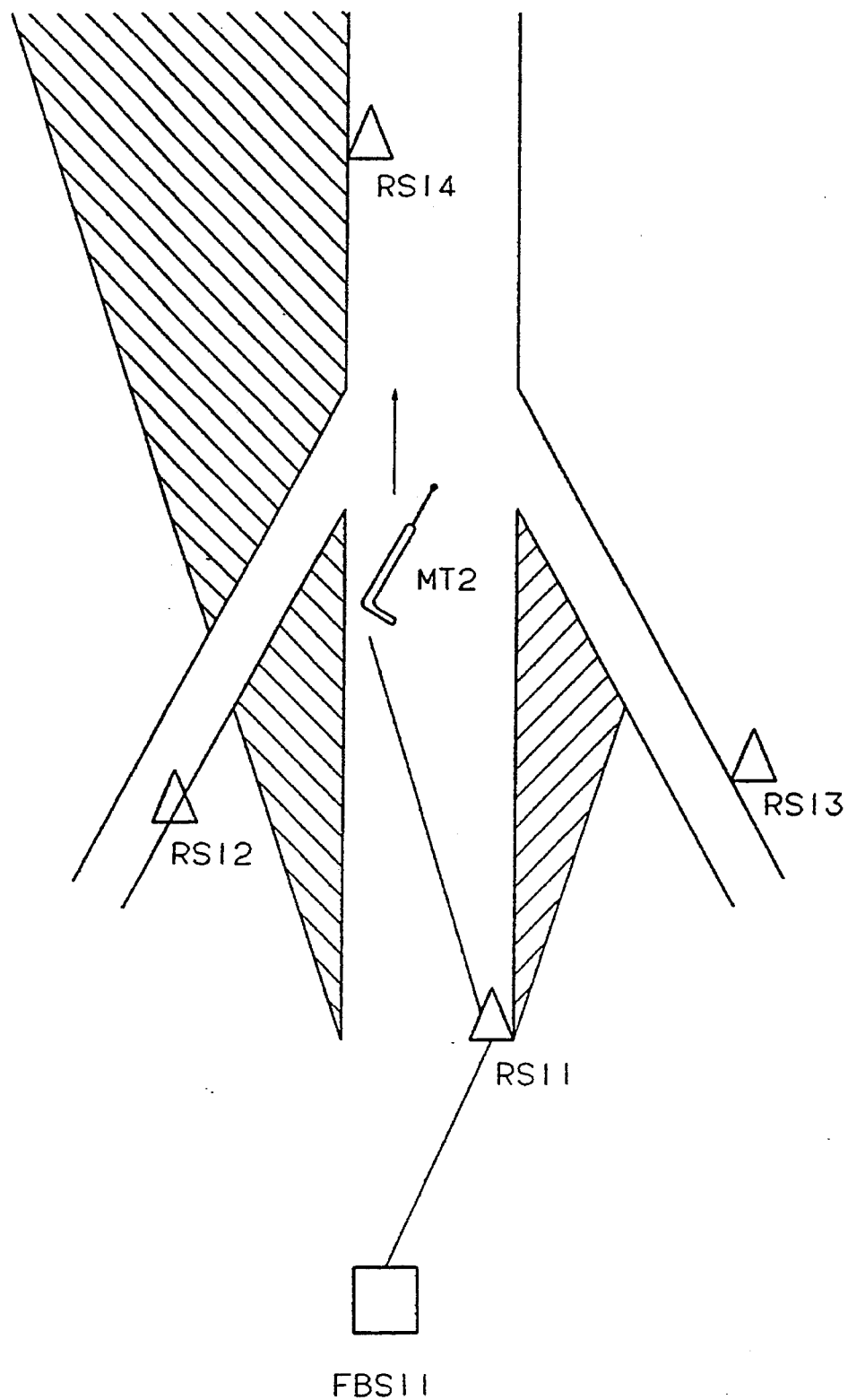
FIG. 3 shows a part of the mobile network MCN of FIG. 1 which is relevant to a mobile terminal MT2 in geographic detail.

Other important applications of the above described hand-over decision are described hereafter and include the support of soft hand-over, macro-diversity and adaptive learning schemes for the hand-over decisions which are discussed with respect to FIG. 3 which represents in geographic detail relay stations RS11–14 and a mobile terminal MT2.

The mobile terminal MT2 is a hand-held terminal in a pedestrian environment and communicates via the relay station RS11 and the fixed base station FBS11 (interconnections shown in full lines) with the fixed network FTN. A possible implementation of the base station FBS11 for instance does not take into account a geographic detail of the present situation and the mobile terminal MT2. In this case in turning left at the crossroads, the mobile terminal MT2 experiences a hard border due to the presence of the building at the street corner and this may result in a sudden connection loss as no provisions have been made for connection with the relay station RS12.

The above described features of the base stations FBS allow this connection loss to be avoided by including in base station FBS11 an adaptive learning algorithm which adapts itself to the geographical location of the fixed base station FBS11. The fixed base station FBS1 is thus for instance able to foresee the possibility of the above described left turn and to react by including the relay station RS72 in the redundant set and by setting up a relay link between the relay station RS12 and the fixed base station FBS11 in such a way that when the mobile terminal MT2 turns left, all preparations are made to avoid connection loss. The fixed base station FBS11 can even include the relay station RS12 and its corresponding link in the active set, meaning that some bandwidth is already reserved albeit that the relay station RS12 is not included in the communication tree. The relay station RS12 is then said to be listening without action.

The latter case where the relay station RS12 is included in the active set whilst the actual communication can only take place via the relay station RS11, obviously also included in the active set, and hence where two parallel communication paths are actively used at the same time, is known as soft hand-over. The latter denotes that the communication path is handed over in a continuous fashion, i.e. that an intermediate state is allowed in which the communication is reconstructed from the information received via simultaneous parallel communication paths. As in the above case, such soft hand-over can generally be used to avoid hard hand-overs in critical environments.

The above concept can be generalized to macro-diversity in which the required communication quality is obtained by systematically reconstructing the communication from information sent over a plurality of parallel paths, in the present example for instance over parallel paths including the relay station RS11, the relay stations RS13–14 if the mobile terminal MT2 continues straight on. Such macro-diversity is important when the protocol on radio access links the indirect coverage mobile radio network ICMRN is Code Division Multiple Access CDMA, well known in the art.

It is to be noted that the above can only be used in the base stations of the mobile communication network MCN because relay links can always be provided in such a way that no inter base station hand-over is required and that the various parallel paths can always be made to end in a same base station acting as actual controlling base station, i.e. in this case in the fixed base station FBS11.

Figure 4:
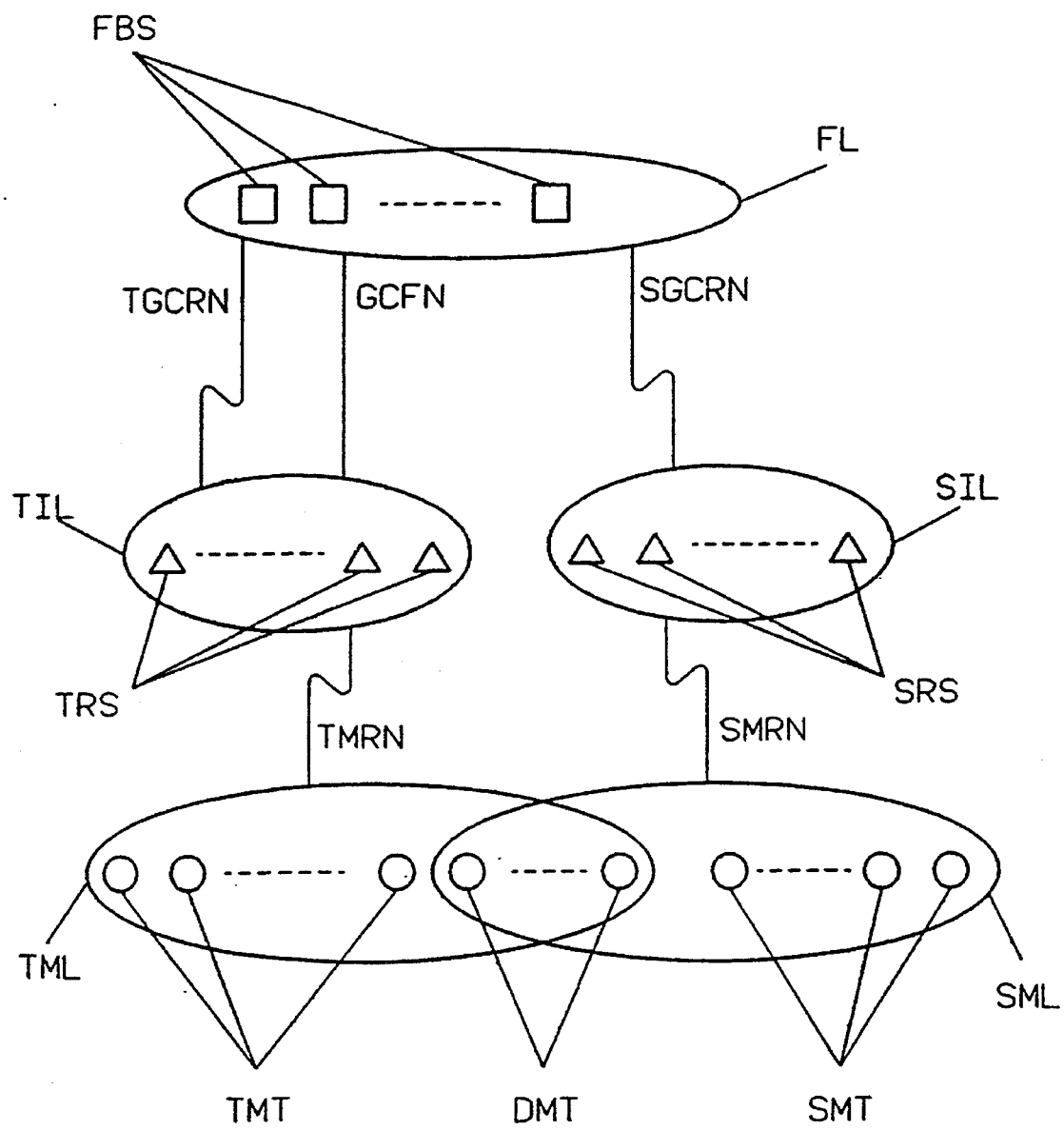
FIG. 4 represents the mobile network MCN of FIG. 1 in more detail.

The mobile, intermediate and fixed levels ML, IL, FL of the mobile communication network MCN of FIG. 1 are shown in more detail in FIG. 4.

The indirect coverage mobile radio network ICMRN of FIG. 1 is split up in two distinct radio access networks, i.e. a terrestrial mobile radio network TMRN and a satellite mobile radio network SMRN which are both characterized by the use of distinct predetermined transmission protocols on their radio access links. Also the mobile level ML and the intermediate level IL are split up in terrestrial and satellite radio communication parts. More particularly, the mobile level ML includes a terrestrial mobile level TML, comprising a plurality of terrestrial mobile terminals TMT as well as a plurality of dual-mode mobile terminals DMT, and a satellite mobile level SML, comprising a plurality of satellite mobile terminals SMT as well as the mobile terminals DMT.

The mobile terminals TMT, DMT of the terrestrial mobile level TML can communicate via the terrestrial mobile radio network TMRN with terrestrial relay stations TRS forming a terrestrial intermediate level TIL. The latter relay stations TRS are coupled to the fixed level FL via a terrestrial part TGCRN of the global coverage radio network GCRN and via the global coverage fixed network GCFN. The mobile terminals SMT, TMT of the satellite mobile level SML can communicate via the satellite mobile radio network SMRN with satellite relay stations SRS forming a satellite intermediate layer SIL. The latter relay stations are coupled to the fixed level FL via a satellite part SGCRN of the global coverage radio network GCRN.

From the above described interconnections it follows that the dual-mode terminals DMT can communicate according to both the terrestrial and the satellite radio transmission protocols, i.e. via both TMRN and SMRN. The satellite dedicated part SML, SRMN, SIL, SGCRN of the mobile network MCN as well as the terrestrial part may be implemented from the description given below using generally known techniques, e.g. CDMA on the radio access links TMRN.

The relay links SCCRN, TGCRN, GCFN in the network MCN are so chosen that they couple the distinct radio access networks to a single uniform fixed level FL independently from the position of the fixed base stations FBS included therein. This means that the flexibility of the relay links is used in such a way that the complex control which is to be implemented in the fixed level FL can be shared even when two distinct and incompatible radio access networks, i.e. TMRN and SMRN are used. Such sharing clearly allows a more cost efficient use of the network equipment in the fixed level.

However, in order for this to be feasible and as explained above, some measurement data regarding the relay links have to be taken into account for making hand-over decisions, e.g. to take into account a rather long and costly relay link so preventing it from being used if the corresponding relay station is an only marginally better communication partner than a relay station with a more optimal relay link.

An important feature of the above described network results from the presence of the dual-mode mobile terminals DMT since these are compatible with two radio access networks and therefore benefit from the coverage area provided by both these networks. They are particularly interesting with regard to the satellite mobile radio network SMRN as this network is intended to cover only specific areas, for instance airplanes, since then the same physical device can equally well be used to access the more global terrestrial mobile radio network TMRN.

With such dual-mode terminals DMT, the present network MCN allows executing hand-overs from one radio access network to the other, thus guaranteeing a more continuous communication between the mobile terminals DMT and the fixed network FTN. Furthermore, if at a particular point in time, communication can be set up over both access networks SMRN and TMRN, the hand-over decision can take into account the overall cost of such communication paths thereby ensuring the cheapest communication for these mobile terminals DMT.

Figure 5:
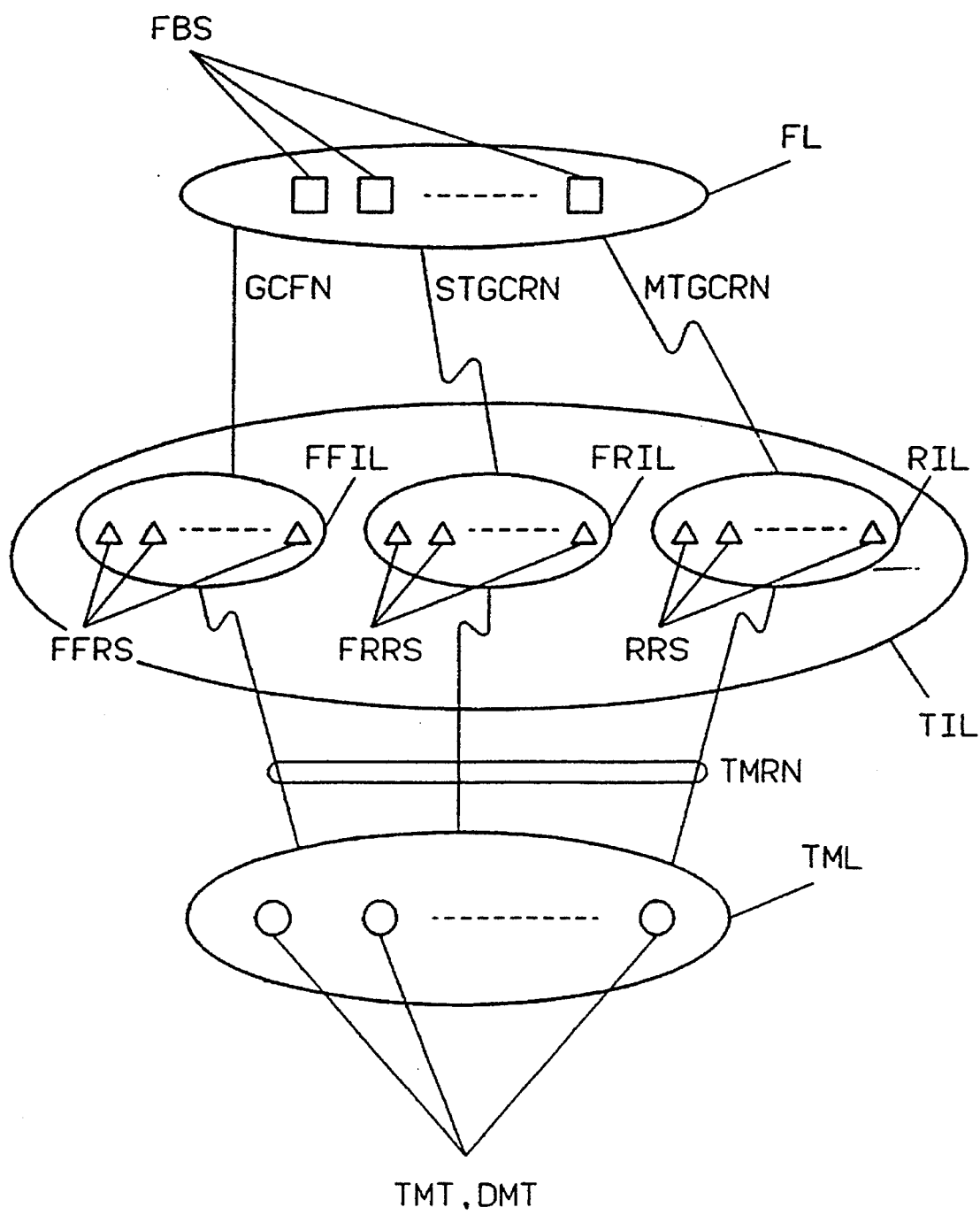
FIG. 5 shows a terrestrial part TMT, DMT, TIL, TMRN, TGCRN, GCFN of the mobile network MCN depicted in FIG. 4 in still greater detail, and, FIG. 6 represents a number of specific environments supported by the terrestrial part of the mobile network MCN as shown in FIG. 5.

The terrestrial part TML, TMRN, TIL, GCFN, TGCRN of the mobile network MCN is shown in more detail in FIG. 5 and is described in detail hereafter.

FIG. 5 shows that the terrestrial intermediate level, TIL of FIG. 4, can be further split up in three parts: a first part FFIL including fixed relay stations FFRS coupled to the fixed level FL via the global coverage fixed network GCFN, a second part also including fixed relay stations FRRS coupled however to the fixed level FL via 'static' radio links STGCRN, i.e. radio links between two fixed stations, and a third part RIL including moving or roaming relay stations RRS coupled to the fixed level FL via 'mobile' radio links MTGCRN, i.e. radio links such as the radio links in the radio access network RAN. The mobile terminals TMT, DMT included in the terrestrial mobile level TML can be coupled to either one of the relay stations FFRS, FRRS, RRS via the terrestrial mobile radio network TRMN, each radio link within TMRN using the same terrestrial radio transmission protocol.

In the present terrestrial part of the mobile communication network MCN, TRMN particularly includes hand-held terminals TMT, DMT characterized by relatively low power consumption relative to transmitted bandwidth. The relay stations of the different terrestrial mobile levels FFIL, FFRL, RIL are each adapted, through their position and design, to provide coverage for mobile terminals in a specific environment, each of the latter mobile levels being adapted to specific types of environments as discussed below. As already described above with reference to FIG. 4, the flexibility of the relay links is such that the fixed level FL, e.g. the position of the fixed base stations FBS therein, is independent from the intermediate level TIL and hence also from TRMN and the environments covered by TIL. This fixed level can thus be shared for communications using any of the relay stations in TIL. Furthermore, this fixed level FL guarantees continuity of the communications by handing them over between the various parts FFIL, FFRL and RIL of TIL and can choose amongst communication paths using distinct ones of the latter parts.

A first class of environments for these mobile terminals TMT, DMT is covered by fixed relay stations FFRS associated with fixed relay links GCFN.

This first class includes particularly the 'conventional' hand-held cellular applications which are already supported by the known GSM-network. But even for this conventional environment the present mobile network MCN can be configured in a more advantageous way. Indeed, due to the fact that relay link measurements are taken into account in the hand-over decision, the corresponding relay links need no longer be constituted by a separate network of links of a uniform predetermined type with negligible influence on the overall communication paths. Therefore, the GCFN of the present mobile network is to a great extent made up of links of the fixed network FTN, with exception made for local interconnections to the relay stations FFRS.

In this way the network resources are used in a more cost effective way whilst also the hand-over decision can take into account for instance the load on the links GCFN by including this load in the measurements involved in the above described hand-over protocol. This can even further improve the synergy between MCN and FTN since the hand-over decision may implement a load balancing algorithm in order to efficiently use the resources of the FTN. Furthermore, the use of FTN-links in the GCFN greatly increases the flexibility of the hand-over decision, as already described above.

Another part of the relay stations FFRS is included in FFIL services environments which do not fall within the scope of 'conventional' cellular networks such as the GSM-network.

A first example thereof are domestic premises which are normally covered by cordless systems such as DECT. In this environment the known cordless consoles can be replaced by a relay station FFRS which is coupled via a relay link of GCFN over the FTN to a nearby fixed base station FBS. It can be clearly seen that in this way the freedom of the mobile terminals TMT and DMT is greatly enhanced as the same hand-held terminal can be used in both typically cellular and typically cordless environments and that a continuous transition between the latter environments can be achieved. It will be clear from this and the following examples that one of the major advantages of the present network precisely is that a greater freedom is offered to the users of the mobile terminals, i.e. that the coverage of the mobile network MCN becomes more and more global due to the fact that any environment or application can be covered by a same set of base stations FBS.

Figure 6:
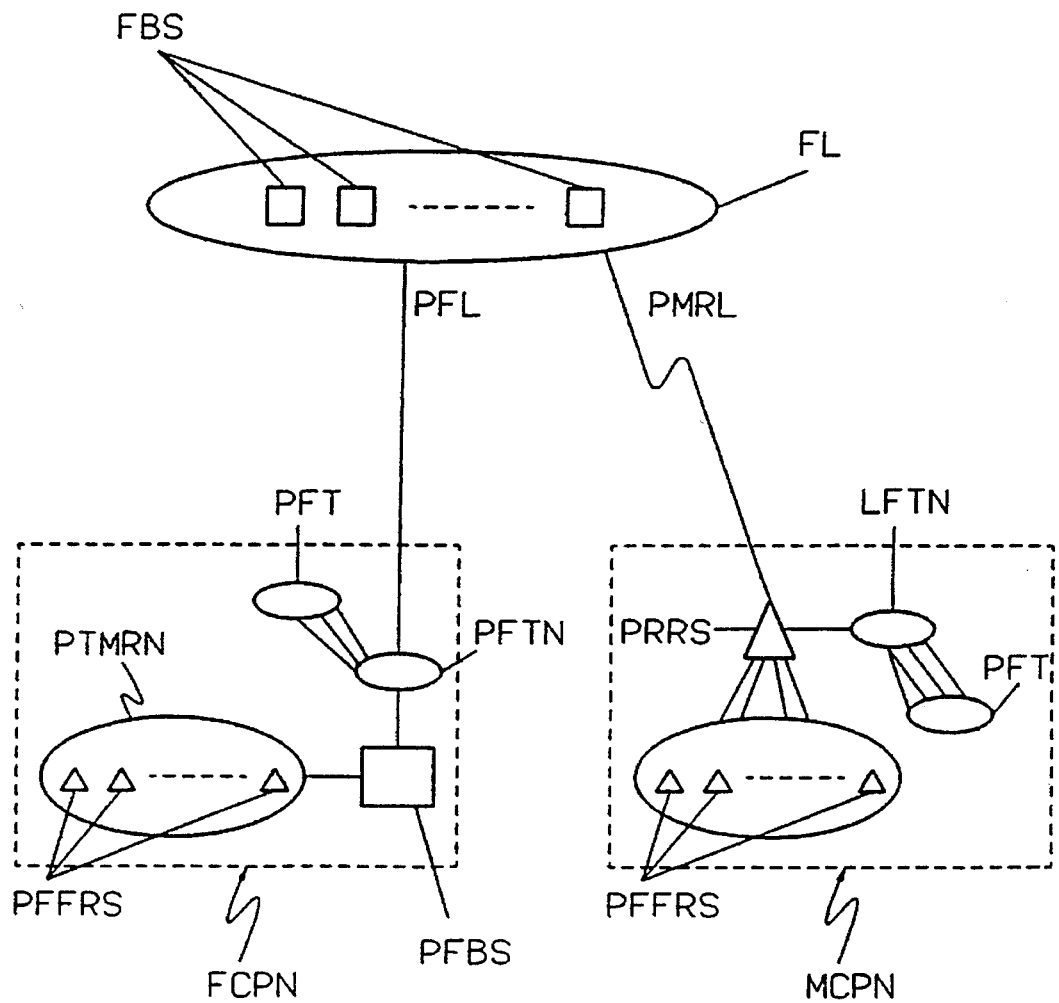

A second example in which FFRS can be used to provide access to the mobile network MCN corresponds to customer premises networks CPN covering for instance large plants or providing a wireless PABX service. As normally such CPN's are PABX's owned by a private owner distinct from the network operator and as such ownership has important implications. This case is dealt with separately later with reference to FIG. 6.

A second class of environments is covered by the relay stations FRRS having 'static' radio links STGCRN to the fixed level FL. The latter relay stations FFRS are provided in locations where a fixed relay link within GCFN cannot be established, e.g. satellites, or unfeasible, e.g. separated rural areas or mountain villages with a small traffic load. In these latter cases it can thus be avoided that either an expensive fixed link or an equally expensive fixed base station FBS of full complexity needs to be provided for this small traffic load. The global coverage of the mobile network MCN can thus be extended to these places with the least cost as possible.

The above use of relay stations FFRS and corresponding relay links STGCRN generally corresponds to a trade-off between providing local intelligence in the form of a base station FBS and concentrating the small amount of traffic by relaying it to a fixed base station FBS of greater capacity. The trade-off then further consists in selecting either a fixed relay link within GCFN or selecting a static radio relay link within STGCRN, for instance established over an existing radio link to a rural area.

In this respect it has to be noted that the radio links within GCRN can include locally a fixed link, the criterion for considering a relay link as a part of GCRN being that at least a part of this relay link uses the radio resource.

A third important class of environments is covered by the relay stations RRS coupled to the fixed level FL through 'mobile' radio links MTGCRN. Such roaming relay stations RRS can be used to cover for instance public transport media or more generally any transport medium carrying a plurality of mobile terminal users. To fix ideas, one such transport medium, a train, is hereafter described in further detail.

The terrestrial mobile radio network TMRN adapted to serve hand-held terminals TMT, DMT would provide an unviable solution if these terminals were situated on the train and had to communicate directly with fixed relay stations FFRS or fixed base stations FBS. However, through its generic structure, the present mobile network MCN allows the traffic of these latter mobile terminals to be concentrated via a high power roaming relay station RRS mounted on the train and coupled to the fixed level FL via a specific type of relay link. In the present case the latter link has to be a mobile radio link within MTGCRN.

It is clear that when such relay links MTGCRN are used, some relay link measurements have to be used for the hand-over decision because the roaming relay station RRS behaves towards the fixed level FL as a mobile terminal itself. If this is the case, the overall communication path over two cascaded mobile radio links, TMRN and MTGCRN, can be supervised centrally by a single fixed base station FBS without having to provide 'mobile intelligence' in the roaming relay station RRS itself.

In connection with the above environment a number of remarks with regard to its management have to be made.

Firstly, one of the relay measurements might regard the speed of the roaming relay station RRS whilst one of the radio link measurements might relate to the speed of the mobile terminal. In this way the hand-over decision can be made dependent upon these speeds in such a way that mobile terminals TMT, DMT are coupled to roaming relay stations with a similar speed, thus ensuring that the number of hand-overs is minimized.

Secondly, with respect to the mobile radio relay link MTGCRN, the hand-over procedure is enhanced when a trunk hand-over of all mobile terminals TMT, DMT coupled to a specific RRS is made when the control of the RRS is to be handed over.

Thirdly, if two radio links can be cascaded in the mobile network MCN, as is presently the case, the fixed base stations FBS, thanks to the fact that it supervises both of these links, can manage the radio resource in a global way taking into account all radio links present within its macro-cell. This feature can for instance be exploited to provide for load balancing and statistical multiplexing with regard to the radio resource in this macro-cell in such a way that the latter is used in a near optimal way. This load balancing can be done via the hand-over decision by selecting new communication paths in such a way that the load on the radio resource is more optimally balanced.

Finally, one has to deal with the train entering a tunnel since its mobile radio relay link MTGCRN can then no longer reach the fixed level directly. Without any further measures having to be taken, the flexibility of the relay links allows to install in the tunnel fixed intermediate repeater stations which are connected themselves to the fixed level FL via repeater links. In this respect it is to be noted that the mobile network MCN as shown in FIGS. 1 to 4 is a conceptual structure and that the relay links may consist of a number of cascaded repeater stations (not shown) with corresponding repeater links (not shown). It can further be understood that these repeater stations and links can be chosen in the same flexible way as is described above with respect to the relay stations RS and relay links RN.

Finally, another important application of the present mobile network MCN is considered. This application relates to the ownership of the various network parts and is described with reference to FIG. 6 which represents in detail two specific parts of the mobile communication network MCN. A first part FCPN constitutes a Fixed Customer Premises Equipment and a second part MCPN constitutes a Mobile Customers Premises Equipment. Both MCPN and FCPN are owned privately, whereas the fixed level FL used as a backbone is owned by a single public operator.

FCPN consists of a number of private fixed relay stations PFFRS coupled to a private fixed base station PFBS. This PFBS is also coupled via a private fixed network PFTN to a number of private fixed terminals PFT. The latter private fixed network PFTN is in its turn coupled to the fixed level FL via a private fixed relay link PFL, e.g. a leased fixed link of FTN, to one of the fixed base stations FBS. When in the coverage area defined by FCPN, the above mobile terminals TMT, DMT may communicate with either the fixed level FL or the PFTN via a private radio access link PTMRN coupled to the relay stations PFFRS. FCPN for instance corresponds to a private exchange PX for a large plant part of which is wireless in order to provide mobility to the employees.

MCPN also consists of a number of private fixed relay stations PFFRS, e.g. each covering a compartment of the above mentioned train, coupled to a private roaming relay station PRRS. In the present case PRRS is coupled on the one hand to the fixed level FL via a private mobile relay link PMRL within MTGCRN and on the other hand directly to a local fixed telecommunication network LFTN to which again a number of private fixed terminals PFT are coupled. MCPN corresponds for instance to the above described train.

The network FCPN is known as such and can be constituted by a private exchange supplemented by a wireless part for the employees of the plant whose mobility is supported by the private fixed base station PFBS via which internal and external communications can be set up for the registered mobile terminals of the employees. In its known form however the macro-cell associated to PFBS cannot be used for mobile terminals TMT, DMT of visitors to the plant thus reducing the global coverage area of the mobile network MCN. In the present mobile network MCN this restriction can however be removed since the existing connection between the private exchange and the fixed telecommunication network can be used to establish a relay link over LFFRS, LFBS, LFTN and PGCFN to a fixed base station FBS. In this way also the mobile terminals TMT, DMT of the visitors can use the last mentioned macro-cell whilst being administered by the latter FBS. This can be viewed as mobile hitch-hiking since these terminals TMT, DMT use a private part not owned by the public operator to establish their communications.

However, this feature requires the ownership characteristics to be included in both the radio link and the relay link measurement data since the operator of the backbone fixed level FL must have means to reward the private owner for this use of its property through mobile hitch-hiking. Such reward can then be based on these ownership characteristics and negotiated agreements between the public operator and the private owner.

The above concept can be extended to parts of the network without local intelligence, such as the MCPN. In this case the railway operator provides private fixed relay stations LFFRS and a private roaming relay station PRRS in such a way that mobile terminals TMT, DMT can communicate from within the train with the outside world. The cost of this equipment can be paid back via the public operator which administers these communications through one of its fixed base stations FBS and which itself can charge the cost thereof to the owner of the mobile terminal TMT, DMT. The railway operator further couples a number of its private fixed terminals PFT through a local network LFTN and the relay station PRRS in order to provide communication in the conventional way without supporting local mobility within the train.

From the above it is clear that the present mobile network MCN allows any part of the network to be installed by owners different from the public operator whilst still covering the coverage areas associated to these parts. This clearly and advantageously allows the investments for a specific global coverage areas to be spread in such a way that those interested in covering a specific private area themselves make the expenses to integrate their desired coverage area in the global coverage area of the mobile network MCN.

While the principles of the invention have been described above in connection with specific apparatus, it is to be clearly understood that this description is made only by way of example and not as a limitation on the scope of the invention.

I claim:

1. A mobile communication network (MCN) adapted to set up communication paths (DCMRN, FBS, LE or ICMRN, RS, GCFN/GCRN, FBS, LE) between any one of a plurality of mobile terminals (MT) and a fixed telecommunication network (FTN) and each including a radio access link (DCMRN, ICMRN), said communication paths (DCMRN, FBS, LE or ICMRN, RS, GCFN/GCRN, FBS, LE) including either a first communication path (ICMRN, RS, GCFN/GCRN, FBS, LE) having an indirect coverage radio access link (ICMRN) between one of said plurality of mobile terminals (MT) and one of a plurality of relay stations (RS), a relay link (GCFN/GCRN) between said one of said plurality of relay stations (RS) and one of a plurality of fixed base stations (FBS), and a local exchange (LE) between a fixed telecommunication network (FTN) and the plurality of fixed base stations (FBS), or including a second communication path (DCMRN, FBS, LE) having a direct coverage mobile radio network (DCMRN) between one of the plurality of fixed base stations (FSB) and one of the plurality of mobile terminals (MT) and the local exchange (LE), said mobile communication network including path selection means (FBS) for selecting, as part of a hand-over decision, at least one communication path from a plurality of possible communication paths (DCMRN, FBS, LE or ICMRN, RS, GCFN/GCRN, FBS, LE) between said one of said plurality of mobile terminals (MT) and said fixed telecommunication network (FTN) based on measurement data of characteristics of radio access links (DCMRN/ICMRN) included in said plurality of possible paths (DCMRN, FBS, LE or ICMRN, RS, GCFN/GCRN, FBS, LE), characterized in that said path selection means (FBS) also bases its selection on measurement data of characteristics of the relay links (GCFN/GCRN) included in said plurality of possible paths (DCMRN, FBS, LE or ICMRN, RS, GCFN/GCRN, FBS, LE).

2. A mobile communication network (MCN) according to claim 1, characterized in that said mobile communication network (MCN) includes a plurality of types of said relay links (GCFN, SGCRN, MTGCRN, STGCRN) and a plurality of types of said relay stations (FFRS, SRS, RRS, FRRS), and that each of said plurality of relay stations (FFRS, SRS, RRS, FRRS) provides a specific coverage area for said mobile terminals (MT) whilst a respective type of each relay link (GCFN, SGCRN, MTGCRN, STGCRN) is dependent on characteristics of a relay station (FFRS, SRS, RRS, FRRS) and of a base station (FBS) being interconnected.

3. A mobile communication network (MCN) according to claim 2, characterized in that on said radio access links (TMRN, SMRN) use is made of a plurality of predetermined transmission protocols corresponding to distinct types of relay stations (TRS, SRS), and that said path selection means (FBS) makes said hand-over decision regarding communication paths (TMRN, TRS, TGCRN/GCFN, FBS or SMRN, SRS, SGCRN, FBS) including said radio access links (TE, SRMN) by way of one of said plurality of predetermined transmission protocols.

4. A mobile communication network (MCN) according to claim 3, characterized in that said plurality of predetermined transmission protocols includes two transmission protocols, at least one of said mobile terminals (DMT) is a multi-mode mobile terminal adapted to operate according to either one of said two transmission protocols, and that said selection also comprises a selection among said distinct types of relay stations (TRS, SRs).

5. A mobile communication network (MCN) according to claim 2, characterized in that said plurality of types of said relay stations (FFRS, SRS, RRS, FRRS) includes a fixed relay station (FFRS) connected to at least one of said base stations (FBS) via at least one type of relay link (GCFN) which is at least partly constituted by a link of said fixed transmission network (FTN).

6. A mobile communication network (MCN) according to claim 5, characterized in that said fixed relay station (FFRS) includes at least one relay station (FFRS, SRS, RRS, FRRS) coupled to a plurality of base stations (FBS) via a corresponding plurality of relay links of said at least one type of relay links (GCFN).

7. A mobile communication network (MCN) according to claim 2, characterized in that said plurality of types of said relay stations (FFRS, SRS, RRS, FRRS) includes a relay station (FRRS, RRS, SRS) connected to at least one base station (FBS) via at least one relay link (GCRN) which is at least partly constituted by a radio link (GCRN).

8. A mobile communication network (MCN) according to claim 7, characterized in that said relay stations (FFRS, RRS, SRS) includes at least one roaming relay station (RRS) connected to at least one base station (FBS) via at least one relay link (MTGCRN) at least partly constituted by a mobile radio link (MTGCRN).

9. A mobile communication network (MCN) according to claim 1, wherein said path selection means (FBS) uses a method for a hand-over protocol for making said hand-over decision, characterized in that the method includes a tracking step in which said measurement data are collected in and organized by said one mobile terminal (MT), a forwarding step in which said organized measurement data are forwarded to said path selection means (FBS) which are included in said one base station (FBS), a decision step and an execution step in which said hand-over decision is made and executed by said selection means (FBS) based on said organized measurement data respectively.

10. A mobile communication network (MCN) according to claim 9, wherein said mobile terminal (MT) is adapted to operate according to said hand-over protocol, characterized in that said mobile terminal (MT) includes the following to perform said tracking step:

receive means for receiving tracking signals transmitted by said base stations (FBS) or said relay stations (RS) included in said possible paths and connected to said mobile terminal via a radio access link (DCMRN, ICMRN) and said tracking signals including information indicative of said measurement data;

measurement extraction means for extracting said radio link and relay link measurement data from said received tracking signals; and organization means for deriving said organized measurement data under the form of a communication tree with branches corresponding to said possible paths.

11. A mobile communication network (MCN) according to claim 9, wherein said base station (FBS) is adapted to operate according to said hand-over protocol, characterized in that said base station (FBS) includes the following to perform said decision step and execution step:

said path selection means for making said hand-over decision based on said organized measurement data, which includes:

an active communication set consisting of at least one communication path which is to be used for said communication between said mobile terminal and said fixed network;

a redundant communication set consisting of stand-by communication paths; and, execution means for executing said hand-over decision by:

activating/deactivating a communication path which is added/removed with respect to a previous active set in such a way that said communication is performed via said active set;

allocating/deallocating to said communication a communication path which is added/removed with respect to a previous redundant set in such a way that all preparations for activating said redundant set are performed.

12. A mobile communication network (MCN) according to claim 11, characterized in that said redundant/active set contains communication paths which are not included in said organized measurement data and are set up/released as a part of said allocating/deallocating step.

13. A mobile communication network (MCN) according to claim 12, characterized in that said path selection means (FBS) learns from experience which communication paths have to be included in said redundant/active set based on said organized measurement data.

14. A mobile communication network (MCN) according to claim 12, characterized in that said parallel communication paths include a radio access link (DCMRN, ICMRN) not included in said organized measurement data.

15. A mobile communication network (MCN) according to claim 11, characterized in that said active set contains a plurality of parallel communication paths over which the same information is transmitted and which are all coupled to said one base station (FBS).

16. A mobile communication network (MCN) according to claim 15, characterized in that said parallel communication paths include a radio access link (DCMRN, ICMRN) not included in said organized measurement data.

17. A mobile communication network (MCN) according to claim 11, characterized in that one of said characteristics is the ownership of said radio access links, relay stations and relay links, said path selection means (FBS) taking into account the availability and cost of said communication paths associated to said ownership.

18. A mobile communication network (MCN), comprising:

mobile terminals (MT) including high-powered vehicle-operated mobile terminals and low-power hand-held mobile terminals;

relay stations (RS) being connected to one of said low-power hand-held mobile terminals of said mobile terminals (MT) by an indirect coverage mobile radio network access link (ICMRN); and fixed base stations (FSB) for communicating with a fixed telecommunication network (FTN) via a local exchange (LE) and being connected to one of said high-powered vehicle-operated mobile terminals of said mobile terminals (MT) by a direct coverage mobile radio network access link (DCMRN) characterized by direct coverage mobile radio network access link information, said fixed base stations (FSB) being connected to said relay stations (RS) by a relay network (RN) having a global coverage radio network relay access link (GCRN) characterized by global coverage radio network relay access link information, and having a global coverage fixed network relay access link (GCFN) characterized by global coverage fixed network relay access link information, and said fixed base stations (FSB) for selecting communication paths (DCMRN, FBS, LE or ICMRN, RS, GCFN/GCRN, FBS, LE) between said mobile terminals (MT) and the fixed telecommunication network (FTN), including either a first communication path (ICMRN, RS, GCFN/GCRN, FBS, LE) having the indirect coverage radio access link (ICMRN) between said mobile terminals (MT) and said relay stations (RS), said relay link (GCFN/GCRN) between said relay stations (RS) and said base stations (FBS), and said local exchange (LE) between said fixed telecommunication network (FTN) and said fixed base stations (FBS), or including a second communication path (DCMRN, FBS, LE) having the direct coverage mobile radio network (DCMRN) between said fixed base stations (FSB) and said mobile terminals (MT) and the local exchange (LE), said fixed base stations (FSB) selecting said communication paths (DCMRN, FBS, LE or ICMRN, RS, GCFN/GCRN, FBS, LE) during a hand-over decision based on (1) the direct coverage mobile radio network access link information, (2) the global coverage radio network relay access link information, and (3) the global coverage fixed network relay access link information.

\* \* \* \* \*

UNITED STATES PATENT AND TRADEMARK OFFICE
CERTIFICATE OF CORRECTION

PATENT NO.  : 5,504,935
DATED       : Apr. 2, 1996
INVENTOR(S) : Leo A.A. Vercauteren It is certified that error appears in the above-indentified patent and that said Letters Patent is hereby corrected as shown below:

At column 19, line 61 (line 9 of claim 3), please delete

"(TE, SMRN)"

and substitute

--(TMRN, SMRN)--.

Signed and Sealed this

First Day of October, 1996

Attest:

BRUCE LEHMAN

Attesting Officer

Commissioner of Patents and Trademarks